March 20, 1934.    J. L. SKUTTLE    1,952,000
WATER SUPPLY REGULATOR FOR HUMIDIFIERS
Filed June 30, 1931
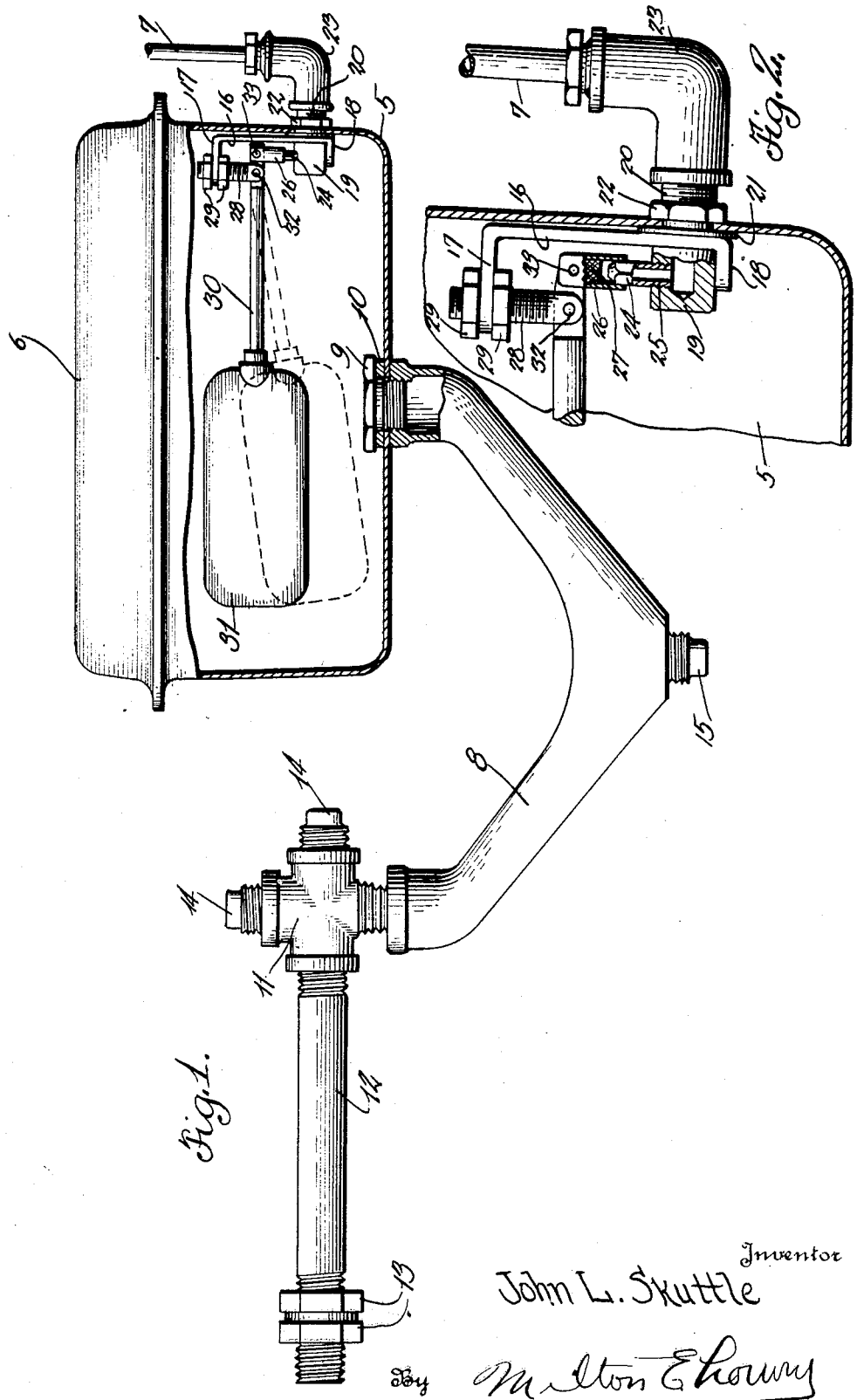
Inventor
John L. Skuttle
By Milton E. Lowry
Attorney Patented Mar. 20, 1934

1,952,000

UNITED STATES PATENT OFFICE 1,952,000

WATER SUPPLY REGULATOR FOR HUMIDIFIERS

John L. Skuttle, Mason City, Iowa

Application June 30, 1931, Serial No. 548,057

1 Claim. (Cl. 137—104)

This invention relates to certain new and useful improvements in water supply regulators for humidifiers.

The primary object of the invention is to provide a valve construction for the effective control of the water supply, the valve and seat being removable and interchangeable, novelty also being predicated upon the mounting for the valve mechanism and associated float.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view, partly broken away and shown in section of a water supply regulator for humidifiers showing the float tank, the float controlled valve mechanism therein, the pipe trap and the pipe outlet to the humidifier; and Figure 2 is an enlarged detail sectional view of the valve mechanism.

Referring more in detail to the accompanying drawing, the reference numeral 5 designates a tank having a removable cover 6 and with which tank, a water service pipe 7 is in communication. Float controlled valve mechanism regulates the delivery of water from the supply pipe 7 to the tank 5 and said tank has one end of a V-shaped pipe trap 8 set into the bottom wall thereof by means of a bushing nut 9 having a gasket 10 interposed between the head flange thereof and the bottom of the tank 5. At the other end of the V-shaped pipe trap 8 is a cruciform fitting 11 connected thereto, a water delivery pipe 12 being threaded into one side of the fitting 11 and carrying lock nuts 13 to provide clamping engagement with a humidifier receptacle, not illustrated. The other two sides of the fitting 11 are provided with removable screw plugs 14 for clean out purposes while the lower end of the V-pipe trap 8 has a drain and clean out plug 15 threaded therein.

The valve mechanism within the float tank 5 comprises a bracket plate 16 having upper and lower angularly bent flanges 17 and 18 respectively. The bracket plate 16 is supported upon the inner face of a side wall of the tank 5 by means of a valve head 19 substantially of block formation and having a threaded stem projecting through registering openings in the bracket plate 16 and wall of the tank, a packing gasket 21 being interposed between the bracket plate and tank while a lock nut 22 threaded on the stem 20 moves into binding engagement with the outer face of the wall. An elbow 23 is interposed between the threaded stem 20 and service supply pipe 7 as illustrated.

A jet nozzle 24 is threaded as at 25 into the upper side of the valve head 19 and is removable therefrom for replacement or repair, while a cup-shaped valve cap 26 having a rubber or cushion insert 27 is adapted to be closed on the jet nozzle. The support for the valve cap 26 includes a screw 28 passed through an opening in the flange 17 at the upper end of the bracket plate 16 with nuts 29 threaded on the screw at opposite sides of the flange 17 for holding the screw in adjusted position. A float arm 30 carrying a float 31 at one of its ends is pivoted as at 32 adjacent its other end to the lower end of the screw 28 while the terminal end of the float arm 30 is pivoted as at 33 to the upper end of the valve cap 26, the valve cap being also removable for replacement or repair.

From the above detailed description of the invention, it is believed that the construction and operation thereof will at once be apparent, it being noted that by actual tests, a valve construction of this character can more efficiently control greatly increased water pressure and more definitely regulate the supply of water to the float tank 5. The removable jet nozzle and valve cap permit replacement of these parts and the adjustable screw 28 determines the closing position of the valve cap upon the jet nozzle to regulate the quantity of water contained in the float tank 5. It is also noted that all of the valve mechanism is supported upon the bracket plate 16 and may be introduced as a unit to the float tank. The pipe trap 8 provides a trap for foreign matter such as lime and the like so that only clear water is delivered to the humidifier.

I claim:—

In a device of the class described, a U-shaped bracket plate adapted to have the closed side thereof vertically secured to a side wall of a tank with the side portions of the bracket plate vertically aligned, a float valve including a valve head braced by the lower side portion of the bracket plate and having a stem projecting through the bracket and tank wall adapted to communicate with a water service pipe, a jet nozzle rising from the head, an adjustable screw depending from the upper side of the U-shaped bracket, a float arm pivoted to the lower end of the screw and a valve cap carried by the float arm between the float arm pivot and bracket to seat on the jet nozzle.

JOHN L. SKUTTLE.